Nov. 17, 1964 J. D. RHODES 3,157,411
LEVER DOLLY
Filed Sept. 19, 1961 3 Sheets-Sheet 1

INVENTOR
James D. Rhodes

BY Alvin Browdy
ATTORNEY

INVENTOR
James D. Rhodes
ATTORNEY

Nov. 17, 1964   J. D. RHODES   3,157,411
LEVER DOLLY
Filed Sept. 19, 1961   3 Sheets-Sheet 3

INVENTOR
James D. Rhodes

BY Alvin Browdy
ATTORNEY

United States Patent Office 3,157,411
Patented Nov. 17, 1964

---

3,157,411
LEVER DOLLY
James D. Rhodes, 421 E. Jefferson St., Falls Church,
Va., assignor of one-third to Washington Scale and
Equipment Company, Inc., Washington, D.C., a corporation of the District of Columbia, and one-third
to Nelson P. Greller and Associates, Washington, D.C.
Filed Sept. 19, 1961, Ser. No. 139,119
19 Claims. (Cl. 280—47.29)

The present invention relates to a lever dolly and more particularly to a lever dolly having a swivel arrangement to permit the handling of freight such as packing cases and the like.

Heretofore, many devices have been proposed for the handling of freight some of which are equipped with swivel arrangements. However, no such devices are known which combine a pry bar having a swivel arrangement to permit the operator to turn the pry while the lip thereof is under a heavy object, the swivel arrangement being readily locked or released as needed.

It is an object of the present invention to provide a novel lever dolly having a novel swivel arrangement.

It is a further object of the present invention to provide a swivelled lever dolly arrangement with novel means for locking and releasing the swivel.

It is a still further object of the present invention to provide a swivelled lever dolly arrangement with a novel means for automatically locking said swivel and for automatically releasing it at the proper time.

Other objects and the nature and advantages of the invention will be apparent from the following description, taken in conjunction with the accompanying drawings, wherein.

Figure 1:
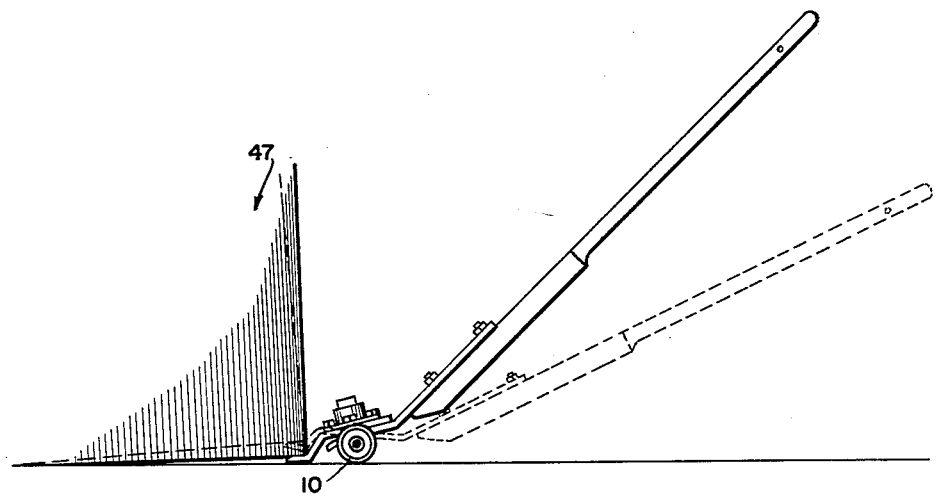
FIG. 1 is a side elevational view of a preferred embodiment of the invention illustrating in full and broken lines the manner in which it is operated in lifting a load.
Figures 2, 4, 5:
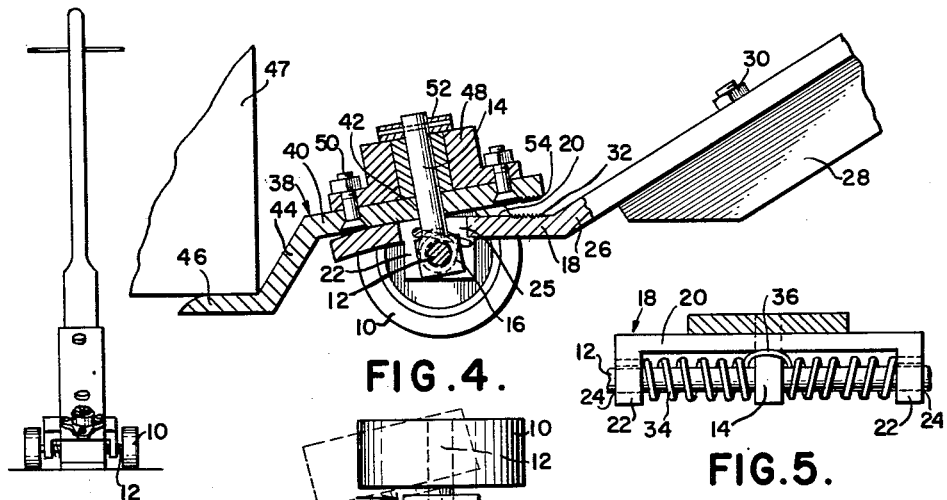
FIG. 2 is a front elevational view of the device.
FIG. 4 is a fragmentary enlarged sectional view taken on the line 4—4 of FIG. 3.
FIG. 5 is a cross-sectional detail view along the line 5—5 of FIG. 3.
Figure 3:
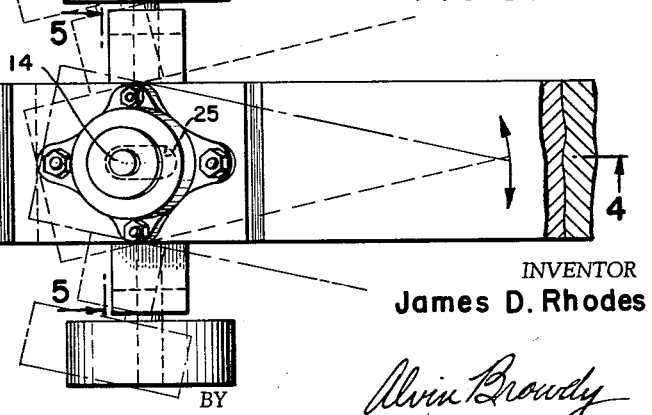
FIG. 3 is a top plan view showing the swivelling of the device in broken lines.

Referring to the drawings and particularly to FIGS. 1-5 thereof, the lever dolly comprises a two-wheeled carriage and a combined lifting and handle bar. The carriage comprises a pair of suitable wheels 10 rotatably secured on the ends of an axle 12. A swivel shaft 14 is provided with an enlarged lower portion having an opening 16 therethrough at right angles to the axis of the shaft. The axle 12 is adapted to pass through the opening 16 so that the swivel shaft 14 can pivot about the horizontal axis of the axle. A bolster plate 18 has a concave upper portion 20 and depending portions 22 each provided with an opening 24 therethrough, said openings 24 being in alignment with one another and adapted to receive the axle therethrough. An opening 25 is provided through the concave portion 20 of the bolster plate 18 and is adapted to permit passage of the swivel shaft 14. The opening 25 is considerably larger than the diameter of the swivel shaft 14 so as to permit the shaft 14 to pivot about the axle 12 with respect to the bolster plate 18. A flat extension 26 is provided on the concave portion 20 of the bolster plate to which the handle 28 is attached by bolts 30. The upper surface of the concave portion 20 adjacent to the extension 26 is provided with a friction surface 32. The friction surface 32 can be made by roughening or knurling the surface or by applying a friction coating.

A torsion spring 34 surrounds the axle 12 at its central portion extending between the depending legs 22 of the bolster plate. Each end of the spring is attached to one of the depending legs 22 and the center portion of the spring 34 has a loop 36 adapted to engage the swivel shaft 14. The spring acts to hold the swivel shaft in the braking position to be described hereafter.

A swivel plate 38 is located immediately above the concave portion 20 of the bolster plate. The swivel plate 38 has a flat portion 40 with an opening 42 therethrough adapted to receive the swivel shaft. The diameter of the swivel shaft and of the opening 42 are similar so that there is no play between them, but the swivel plate pivots with the swivel shaft with respect to the axle 12. The intermediate portion 44 of the swivel plate extends downwardly at an angle with respect to the flat portion 40 and the front portion or nose 46 is at a lower level than the flat portion 40. A flange bearing 48 is bolted onto the swivel plate by bolts 50 and a shaft collar 52 is provided over the bearing to retain it on the swivel shaft.

The rearmost lower surface of the flat portion 40 of the swivel plate is provided with a friction surface 54. This friction surface is adjacent to the friction surface 32 of the bolster plate.

In normal position, the tension spring 34 acts to hold the swivel shaft rearwardly thus engaging the friction surface of the swivel plate and the friction surface of the bolster plate locking them into engagement so that no relative rotation is permitted between them. The lever dolly is moved alongside a load 47, as shown in FIG. 1, until the nose 46 of the swivel plate is under the edge thereof. The lever dolly is then tilted back by lowering the handle, as shown in dotted lines in FIG. 1, to lift the load off the ground and at the same time, the weight of the load counteracts the tension of the spring 34 and allows the swivel shaft and swivel plate automatically to rotate forward around the axle 12 until there is no longer contact between the friction surfaces so that the assembly is free to swivel.

The type and strength of the spring is so designed as to release the unit automatically for swivel at a predetermined load condition; when the load is removed, the device automatically locks against swivel.

Two or more lever dollies can be used on a single load spaced thereabout and the load can be readily moved to the desired position with the swivels free to rotate. As soon as the load is removed from the nose of the swivel plate, it automatically rotates back to the locked position.

Figure 6:
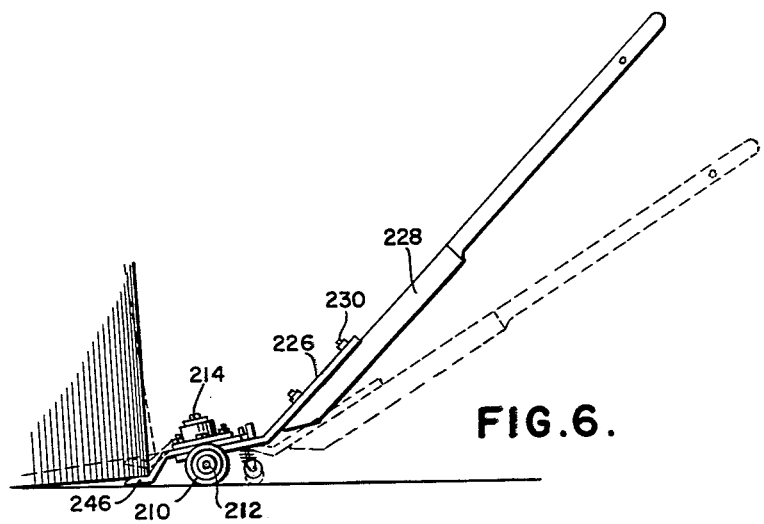
FIG. 6 is a side elevational view of a modified form of the invention illustrating in full and broken lines the manner in which it is operated.
Figure 7:
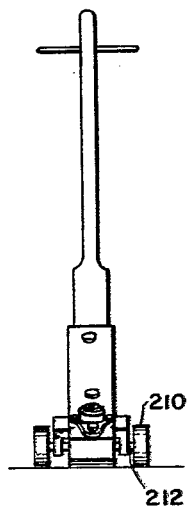
FIG. 7 is a front elevational view of the same.

In the form of the invention shown in FIG. 6, the wheels 210 are rotatably secured on the ends of an axle 212. A bolster plate 218 has a flat upper surface 220 and two depending portions 222 each provided with an opening 224 therethrough, said openings 224 being in alignment with one another and adapted to receive the axle therethrough. An opening 225 is provided through the flat upper portion 220 of the bolster plate 218 for a purpose to be described hereafter. An extension 226 is provided on the bolster plate extending upwardly at an angle to the flat portion 220. A handle 228 is attached to the extension 226 by bolts 230.

A swivel shaft 214 is integral with said bolster plate 218 and extends upwardly from the flat portion 220 thereof. A swivel plate 238 is located immediately above the bolster plate 218 and includes a flat portion 240, an intermediate portion 244 extending downwardly at an angle thereto and a front nose portion 246 at a lower level than the flat portion 240. The flat portion 240 has an opening 242 thereto adapted to receive the swivel shaft 214, and a slot 253 extending into the rearmost portion thereof. A flange bearing 248 is bolted onto the swivel plate by bolts 250 and a shaft collar 252 is provided over the bearing to retain it on the swivel shaft.

A castor wheel assembly 254 is mounted on the lower end of a shaft 256 which passes through the opening 225 in the bolster plate 218. A spring 258 surrounds the shaft 256 below the bolster plate 218 providing a resilient mounting for the castor wheel assembly. A locking bar 260 having an opening therethrough is mounted on said shaft with the shaft passing through said opening and with a washer 262 located above and below said locking bar 260. The locking bar 260 and washers 262 are retained in proper position on said shaft 256 by means of a pair of cotter pins 264 located above and below said washers and passing through said shaft. A guide member 266 is attached to the bolster plate 218 in alignment but rearwardly of the shaft 256. The guide member 266 consists of a flat portion 268 and a pair of upstanding legs 270 which act as a guide for the travel of the locking bar 260. The locking bar 260 is so mounted that the front portion thereof fits into the slot 252 when the swivel plate is locked against rotation. When the dolly is tilted rearwardly, as when the load is being lifted, the castor wheel assembly 254 contacts the ground, compresses the spring 258 as the shaft 256 rises through the bolster plate 218 carrying the locking bar 260 upwardly out of the slot 252, thus releasing the swivel plate 238 and permitting relative rotation between the swivel plate and the bolster plate.

Figure 9:
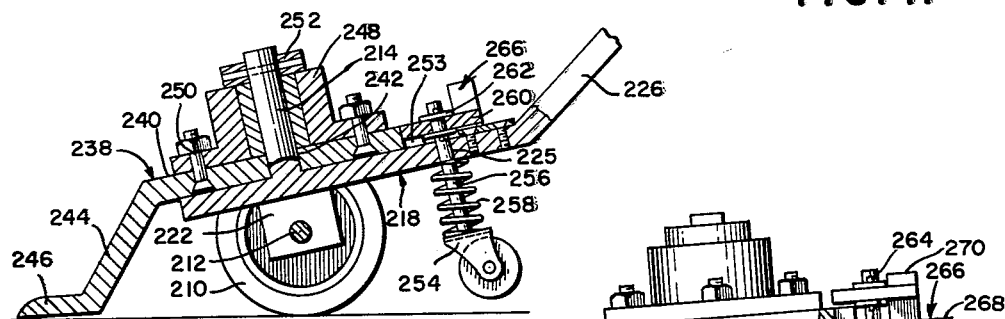
FIG. 9 is an enlarged cross-sectional view taken along the line 9—9 of FIG. 8.
Figure 10:
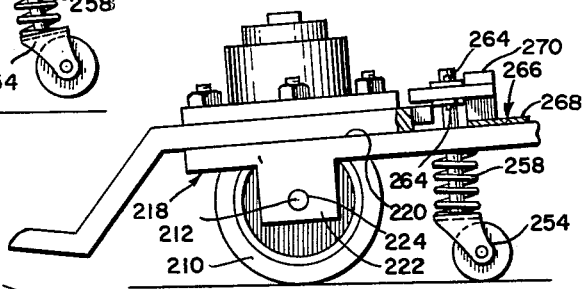
FIG. 10 is an enlarged side elevational view partly in section showing the device in the unlocked position.
Figure 8:
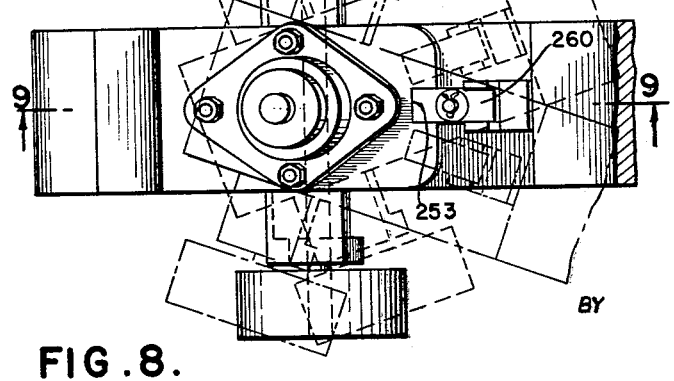
FIG. 8 is a top plan view of the same showing the swivelling of the device in broken lines.

In operation, when the device is in the solid line position of FIG. 6 and as shown in FIG. 9, the castor assembly 254 is out of contact with the ground and the locking bar 260 is positioned in the slot 252 of the swivel plate. In this position, relative rotation between the swivel plate and the bolster plate is not permitted and the device may be considered to be in the locked position. The lever dolly is then moved alongside a load, as shown in FIG. 6, until the nose 246 of the swivel plate is under the edge thereof. The lever dolly is then tilted back to the dotted line position of FIG. 6 as shown in detail in FIG. 10 to lift the load off the ground and simultaneously and automatically to release the locking bar 260 from the slot 252 of the swivel plate thereby unlocking the dolly for relative rotation between the swivel plate and the bolster plate. This is accomplished by upward movement of the castor assembly 254, its shaft 256 and the locking bar 260.

Thus, it will be seen from a study of both forms of the invention so far described that a lifting of the load by tilting back of the dolly acts automatically to unlock the swivel plate and permit relative rotation of the swivel plate and the bolster plate. When the dolly handle is raised and the swivel plate and bolster are aligned and the load is released, the bolster plate and the swivel plate are again automatically locked together.

The automatic action for locking and unlocking the swivelling of the device is very convenient and results in a time saving.

For certain purposes, a mechanical locking arrangement is desired. This form of the invention is illustrated in FIGS. 11-14. The wheels 310 are rotatably secured on the ends of an axle 312. A bolster plate 318 comprises a flat upper plate 320 and depending portions 322 each provided with an opening therethrough to accommodate the axle. An extension 326 is provided on the bolster plate extending upwardly at an angle to the flat portion 320. A handle 328 is attached to the extension 326 by bolts 330.

A swivel plate 338 is located immediately below the bolster plate 318 and includes a flat portion 340, an intermediate portion 344 extending downwardly at an angle thereto and a front nose portion 346 at a lower level than the flat portion 340. The flat portion 340 has a swivel shaft 314 integral therewith and extending upwardly therefrom through an opening in the bolster plate. A slot 353 is provided extending into the rear of the flat portion 340.

A flange bearing 348 is bolted onto the bolster plate around the upper portion of the swivel shaft 314 by bolts 350, and a shaft collar 352 is provided over the bearing to retain it on the swivel shaft.

The locking mechanism includes an operating rod 360 mounted for sliding movement onto the handle 328 by means of a plurality of rod guides 362 mounted on the handle 328. At the lower end of rod 360 is attached a latch member 364. The latch member 364 has a locking nose 366 at the opposite end from which it is attached to the rod 360, and trunnions or pivot pins 368 at an intermediate point on the latch. The trunnions or pivot pins 368 are mounted in a supporting bracket 370 which is attached onto the bolster plate 318. The locking nose 366 is adapted to engage the slot 353 in the swivel plate 338 to lock the swivel plate 338 and the bolster plate 318 against relative rotation. A spring member 372 is mounted on the rod 360 between adjacent rod guides 362 and acts to hold the latch member 364 in the locked position. A hook 374 is located on the outer end of the rod 360 and is adapted to be grasped for reciprocating the rod against the action of the spring to release the locking nose 366 of the latch 364 from the slot 353 in the swivel plate.

Figures 11, 12:
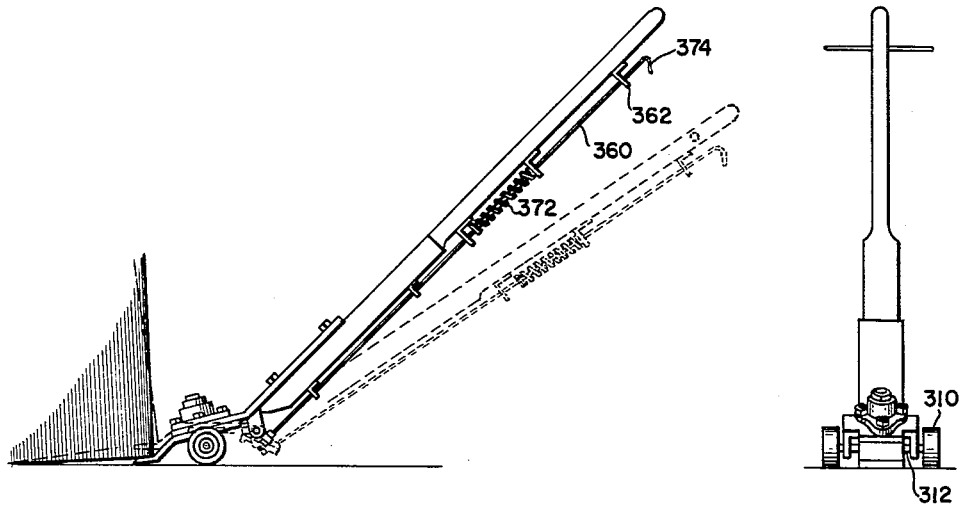
FIG. 11 is a side elevational view of a modified form of the invention illustrating in full and broken lines the manner in which it is operated.
FIG. 12 is a front elevational view of the same.
Figure 14:
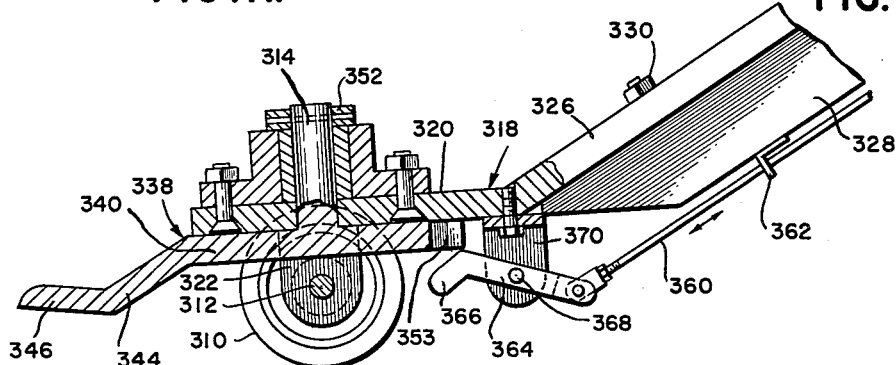
FIG. 14 is an enlarged cross-sectional view taken on the line 14—14 of FIG. 13.
Figure 13:
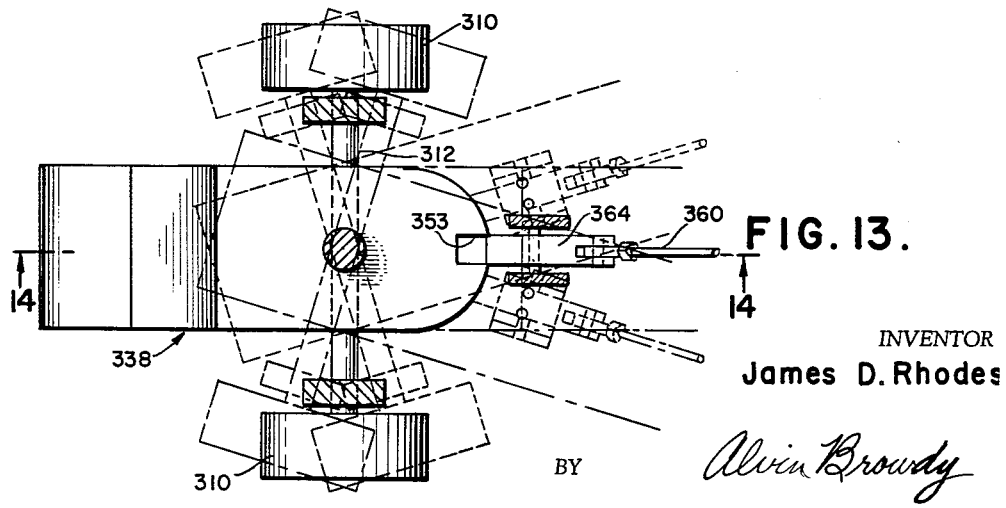
FIG. 13 is a top plan view of the same showing the swivelling of the device in broken lines.

In operation, when the device is in the solid line position of FIG. 11, the swivel plate 338 and the bolster plate 318 are locked against relative rotation by engagement of the locking nose 366 of the latch 364 in the slot 353 in the swivel plate. In this locked position, the lever dolly is moved alongside a load, as shown in FIG. 11, until the nose 346 of the swivel plate is under the edge thereof. The lever dolly is then tilted back to the dotted line position of FIG. 11 to lift the load off of the ground. The swivel plate and bolster plate may now be released for relative rotation, as shown in FIGS. 13 and 14, by pulling on the hook 374 of the rod 360, thus compressing the spring 372 causing the latch 364 to pivot about its trunnions 368 until its locking nose 366 is clear of the slot 353 in the swivel plate. The swivel plate 338 and bolster plate 318 are thus unlocked and released for relative rotation during moving of the load using two or more of such devices.

Although in FIGS. 6-10 the swivel shaft is shown to be integral with the bolster plate and the swivel plate is above the bolster plate, it should be understood that this could be reversed with the swivel shaft being integral with the swivel plate and the bolster plate located above the swivel plate. Likewise, in FIGS. 11–14 wherein the swivel shaft is shown to be integral with the swivel plate with the bolster plate thereabove, it could be reversed with the swivel shaft integral with the bolster plate and the swivel plate located thereabove.

It will be obvious to those skilled in the art that various changes may be made without departing from the spirit of the invention and therefore the invention is not limited to what is shown in the drawings and described in the specification, but only as indicated in the appended claims.

What is claimed is:

1. A lever dolly comprising an axle, wheels mounted on said axle, a bolster plate rotatably mounted with respect to said axle and adapted to rotate with respect to the horizontal axis of said axle, a swivel plate rotatably supported with respect to said bolster plate to permit relative rotation between said bolster plate and said swivel plate about an axis substantially perpendicular to the axis of said axle, said axis passing through said axle axis, a swivel shaft rotatably mounted with respect to said axle and forming a connection between said bolster plate and said swivel plate, said swivel shaft being coincident with said axis which is substantially perpendicular to the axis of said axle, and a nose portion on said swivel plate extending forwardly from said swivel plate at a lower level than said swivel plate to engage beneath a load to be lifted and to support said load while being transported.

2. A lever dolly in accordance with claim 1 wherein said nose portion on said swivel plate which engages said load is substantially parallel to the upper level of said swivel plate.

3. A lever dolly in accordance with claim 1, wherein means are provided for locking said swivel plate and said bolster plate together to prevent rotation thereof with respect to said bolster plate.

4. A lever dolly in accordance with claim 3, wherein said means for locking said swivel plate and said bolster plate together are automatically released when a load is lifted by said nose portion.

5. A lever dolly in accordance with claim 4, wherein said means for locking includes friction surfaces are applied to adjoining portions of said bolster plate and said swivel plate to prevent relative rotation of said plates when they are in engagement, and means to hold said friction surfaces in engagement until a load is applied.

6. A lever dolly in accordance with claim 5, wherein the upper surface of said bolster plate is curved and the lower surface of said swivel plate is flat said swivel shaft acting as a means for pivoting said swivel plate along said curved surface from the locked to the unlocked position.

7. A lever dolly in accordance with claim 4, wherein said means for locking includes a slot in said swivel plate and a locking device mounted on said bolster plate, said locking device being adapted to engage said slot to lock said swivel plate and said bolster plate together.

8. A lever dolly in accordance with claim 7, wherein said locking device is mounted for reciprocation in a vertical direction to release said swivel plate when a load is being lifted by said dolly.

9. A lever dolly in accordance with claim 8, wherein said locking device is mounted on a shaft, a castor assembly at the lower end of said shaft, said shaft being mounted to permit reciprocation with respect to said bolster plate whereby when said castor assembly contacts the ground in lifting a load, the locking device is lifted out of said slot permitting relative rotation between said swivel plate and said bolster plate.

10. A lever dolly in accordance with claim 7, wherein said locking device is mounted on a shaft, a castor assembly at the lower end of said shaft, said shaft being mounted to permit reciprocation with respect to said bolster plate whereby when said castor assembly contacts the ground in lifting a load, the locking device is lifted out of said slot permitting relative rotation between said swivel plate and said bolster plate.

11. A lever dolly in accordance with claim 3, wherein said means for locking includes a slot in said swivel plate and a locking device mounted on said bolster plate, said locking device being adapted to engage said slot to lock said swivel plate and said bolster plate together.

12. A lever dolly in accordance with claim 11, wherein said locking device is pivotally mounted, and means to pivot said locking device into and out of the slot in said swivel plate.

13. A lever dolly in accordance with claim 12, further including a handle attached to said bolster plate, and said means for locking includes an actuating means for pivoting said locking device attached to said handle.

14. A lever dolly comprising an axle, wheels mounted on said axle, a bolster plate rotatably mounted with respect to said axle and adapted to rotate about the horizontal axis of said axle, an elongated opening through said bolster plate, a swivel shaft rotatably mounted with respect to said axle and extending upwardly through said elongated opening and adapted to rotate about the horizontal axis of said axle and with respect to said bolster plate, a swivel plate located above said bolster plate, an opening through said swivel plate, said swivel shaft extending through said opening so that said swivel plate and said swivel shaft rotate together with respect to said axle, a friction surface located on a portion of the upper surface of said bolster plate, a second friction surface located on a portion of the lower surface of said swivel plate, said two friction surfaces being located in alignment so that when in engagement with one another relative rotation between said bolster plate and said swivel plate is prevented, and a spring adapted to retain the two friction surfaces in engagement until a load is applied, said load acting against said spring to pivot said swivel shaft and swivel plate with respect to said bolster plate thereby releasing said friction surfaces and permitting relative rotation between said swivel plate and said bolster plate.

15. A lever dolly in accordance with claim 14, wherein the upper surface of said bolster plate is curved and the lower surface of said swivel plate is flat, said swivel plate pivoting along said curved surface from the locked to the unlocked position.

16. A lever dolly comprising an axle, wheels mounted on said axle, a bolster plate rotatably mounted with respect to said axle and adapted to rotate about the horizontal axis of said axle, an opening through said bolster plate, a swivel plate located below said bolster plate, a swivel shaft integral with said swivel plate and extending upwardly therefrom, said swivel shaft extending through said opening in said bolster plate so that said bolster plate and said swivel shaft rotate together with respect to said axle, a load lifting nose portion on the front of said swivel plate, a slot in the rear portion of said swivel plate, and a latch adapted for movement into and out of said slot for locking and unlocking said swivel plate for rotation relative to said bolster plate.

17. A lever dolly in accordance with claim 16, wherein said latch is mounted on said bolster plate for pivotal movement.

18. A lever dolly in accordance with claim 17, wherein a handle is provided on said dolly, and means mounted on said handle for actuating the pivotal movement of said latch.

19. A lever dolly comprising an axle, wheels mounted on said axle, a bolster plate rotatably mounted with respect to said axle and adapted to rotate about the horizontal axis of said axle, a swivel shaft integral with said bolster plate and extending upwardly therefrom, a swivel plate located above said bolster plate, an opening through said swivel plate, said swivel shaft extending through said opening so that said swivel plate and said swivel shaft rotate together with respect to said axle, a slot in the rear portion of said swivel plate, an opening through said bolster plate adjacent to said slot, a shaft extending through said opening, ground engaging means located on the bottom of said shaft, a locking bar mounted on the upper portion of said shaft above said bolster plate, said locking bar being in alignment with said slot, whereby when the ground engaging means comes into contact with the ground the shaft rises through said opening raising the locking bar out of said slot thereby releasing said swivel plate for rotation with respect to said bolster plate.

References Cited in the file of this patent

UNITED STATES PATENTS

| | | |
|---|---|---|
| 416,990 | Campbell | Dec. 10, 1889 |
| 1,035,352 | Johnson | Aug. 13, 1912 |
| 2,744,762 | Kirk | May 8, 1956 |

FOREIGN PATENTS

| | | |
|---|---|---|
| 180,463 | Germany | Jan. 6, 1907 |
| 333,459 | Germany | May 1, 1919 |